R. H. DE LAUNTY.
TRAILER.
APPLICATION FILED FEB. 11, 1921.

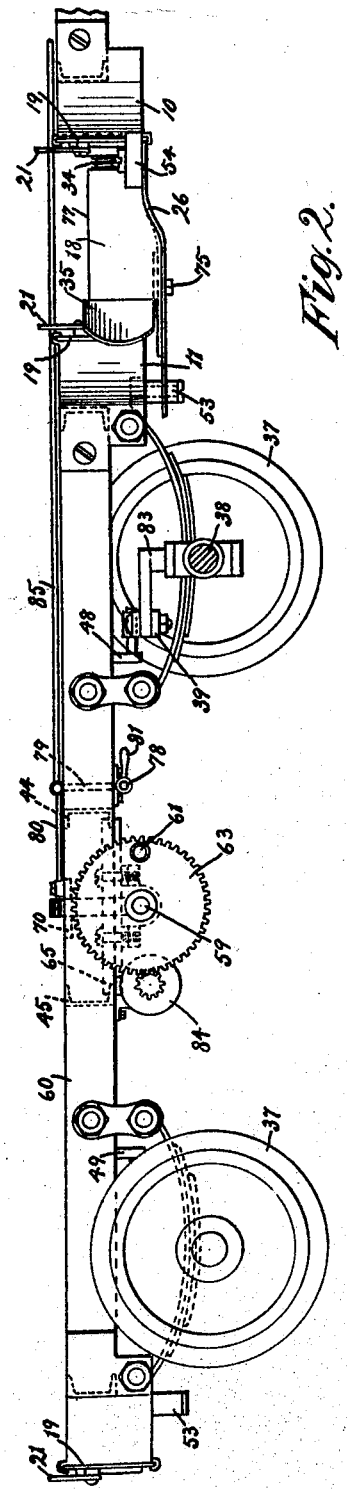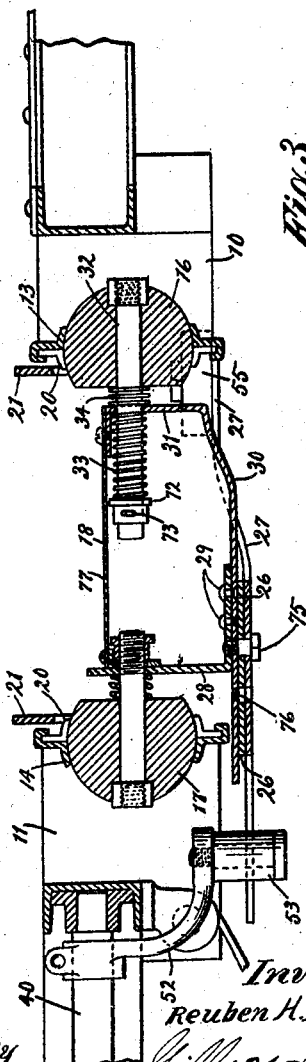

1,413,105.

Patented Apr. 18, 1922.
3 SHEETS—SHEET 3.

Inventor:
Reuben H. DeLaunty
By Gillson & Gillson
Attys.

UNITED STATES PATENT OFFICE.

REUBEN H. DE LAUNTY, OF CHICAGO, ILLINOIS.

TRAILER.

1,413,105.  Specification of Letters Patent.  Patented Apr. 18, 1922.

Application filed February 11, 1921. Serial No. 444,283.

*To all whom it may concern:*

Be it known that I, REUBEN H. DE LAUNTY, a citizen of the United States, and resident of Chicago, county of Cook, and State of Illinois, have invented certain new and useful Improvements in Trailers, of which the following is a specification, and which are illustrated in the accompanying drawings, forming a part thereof.

The invention relates to trailers and has as an object the provision of a trailer that may be drawn with either end forward and may have all four wheels steered or the forward wheels only, no matter which end is drawn forward; a further object is the provision of a trailer which may be adjusted to have its forward wheels guided by the draft attachment and which has means for manual control of the direction of the rear wheels when the forward wheels only are steered.

Other objects of the invention will appear from the following description when read in connection with the drawings in which:

Fig. 2 is a side elevation partly in section on line 2—2 of Fig. 1;

Fig. 3 is a detail section on line 3—3 of Fig. 1 drawn to an enlarged scale;

Figure 1:
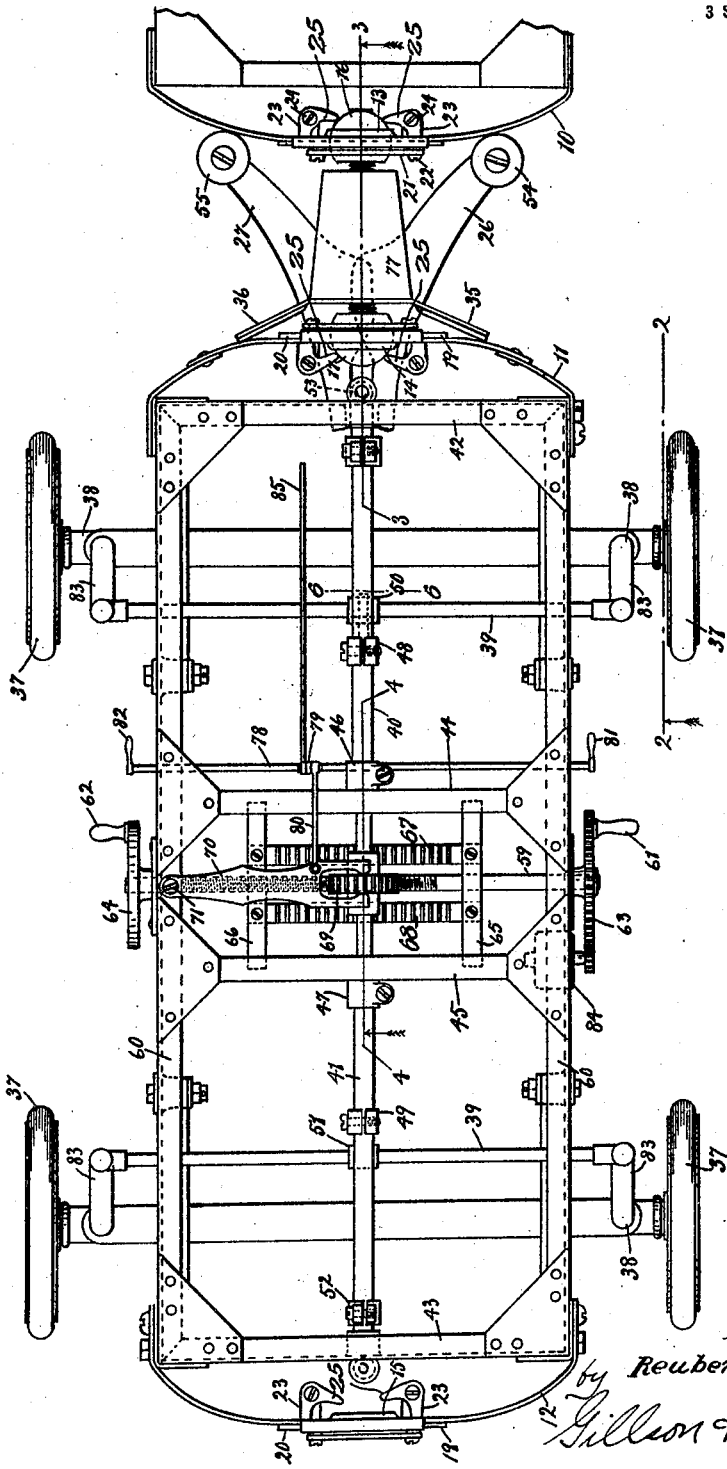
Fig. 1 is a plan view showing a fragment of a propelling vehicle.

For coaction with the draw bar and trailer steering mechanism a bow 10 is shown attached to the rear end of the propelling vehicle and a bow 11 and 12 at each end of the trailer. A socket 13, 14 and 15 is shown at the center of each bow to receive the balls 16, 17 one on each end of the draw bar 18. To hold the balls 16, 17 in the sockets 13, 14 each socket is provided with a pair of sliding socket members 19, 20, one of which as 20 carries a latch 21 adapted to take over a stud 22 carried by the other member 19. When the socket members 19, 20 are pushed together and latched with a ball 16 or 17 in the socket 13 or 14, the ball is held against withdrawal. To automatically slide the socket members 19, 20 together when the ball is entered into the socket a bell crank 23 for each socket member 19 and 20 is pivoted as at 24 on a lug projecting from the bow 10, 11 or 12 and each bell crank has an end 25 projecting into the path of the ball 16 or 17. When the ball is entered into the socket it impinges upon the end 25 of each bell crank 23 when the other end will force the socket members 19, 20 toward each other into a position such that the latch 21 may be engaged with the stud 22.

The draw bar 18 is made up of a plate 28 to which the ball 17 is rigidly bolted, the lower end of which plate is secured as by rivets 29 to a plate 30 bent to form vertical piston 31 having an opening through which the rod 32 slides. Springs 33 and 34 are placed on the rod 32, spring 33 cushioning the draft stresses which it transmits to a washer 72 and cotter pin 73, while spring 34 cushions the buffing stresses. The arms 26 and 27 are pivoted upon a bolt 75. The plate 30 is extended backward beyond the plate 28 and has an additional hole 76 to which the bolt 75 may be shifted to vary the action of the arms 26 and 27. A cover 77 may be placed over the draw bar and serves to give additional strength thereto. To preserve the relation of the draw bar to the fore and aft line of the trailer the plate 31 has wings 35, 36 which abut against the bow 11 or 12 and are rounded at their ends to accommodate slight vertical movements of the draw bar.

The wheels 37 are each mounted on a steering knuckle 38 and the arms 83 of opposite knuckles are connected by a steering rod 39, as is usual in automobile practice. The arms 83 of each steering knuckle 38 extend toward the transverse central line of the trailer, in order that a movement of both of the rods 39 in the same direction may have an opposite effect on the wheels to properly position them to round a curve. To control the steering rods 39, fore and aft shafts 40, 41 are journaled in the end sills 42, 43 and in cross sills 44 and 45, a collar 46, 47 being clamped on each shaft to prevent endwise motion of the shaft through the sills 44, 45. Cranks 48, 49 are clamped on the shafts 40, 41 and each pivotally engages a collar 50, 51 on the steering rods 39. To coact with the arms 26, 27 a steering arm 52 is clamped to the end of each of shafts 40 and 41 and bears a roller 53 which is adapted to be engaged on opposite sides by the ends of the arms 26, 27.

The action of the steering arms 26, 27 is the same as described in my copending application 360,725, filed February 24, 1920. When the angular relation between the propelling vehicle and the trailer changes, the bow 10, 11 or 12 which is in contact with the rollers 54, 55 on the ends of the arms 26, 27 will swing the arm 52 to move the wheels 37 in a direction to cause the trailer to track with the propelling vehicle.

To make it possible to steer all four wheels of the trailer by the action of arms 26, 27, or but two of them as desired, the shafts 40, 41 are extended to abutting relation, with squared ends 56, 57 and a sleeve 58 with a squared interior is slipped on the shafts. If the sleeve is placed to engage the ends of both shafts the two must revolve together and all four wheels will be moved, but if the sleeve is slipped to a position upon one shaft only the two shafts will be separate in their action.

When only the forward wheels of the trailer are to be steered the rear wheels must be locked in a fixed angular relation with reference to the trailer, and it is important that they be accurately in line with the path of movement to avoid undue friction and wear upon the tires. To adjust the rear wheels and lock them in such position a screw threaded shaft 59 may be journaled in the side sills 60 of the trailer and is shown as provided with cranks 61, 62, carried by disks 63, 64 keyed to the shaft. A pair of cross members 65, 66, having their ends recessed to engage and slide upon the lower flanges of cross sills 44, 45 are threaded upon the shaft 59 and are bolted to racks 67, 68, therefore the racks 67, 68 are moved transversely of the vehicle when one of the cranks 61, 62 is operated.

The sleeve 58 has integral therewith a pinion 69 which is out of mesh of either of the racks 67, 68 when the sleeve is in engagement with both of the shafts 40, 41 but is in mesh with one of the racks whenever it is out of engagement with one of the shafts 40, 41. To shift the sleeve 58 an arm 70 having a bifurcated end embracing the pinion 69 is pivoted to the side sill 60 at 71.

Figure 4:
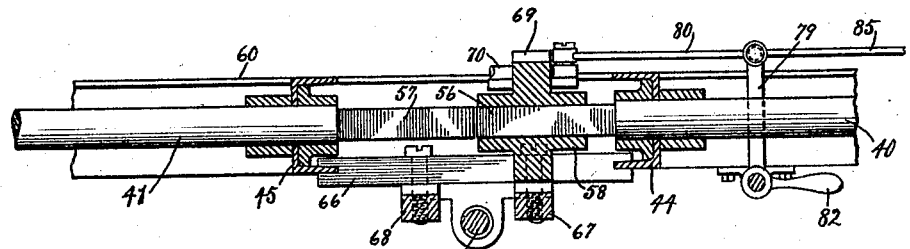
Fig. 4 is a detail section on line 4—4 of Fig. 1 to an enlarged scale with parts in modified position.
Figure 5:
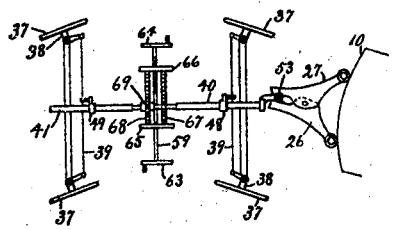
Fig. 5 is a diagrammatic plan view showing the four wheel steering action.
Figure 6:
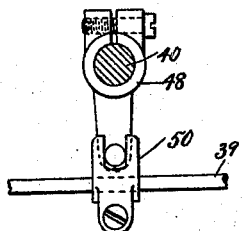
Fig. 6 is a detail section on line 6—6 of Fig. 1, drawn to an enlarged scale.

When the forward wheels only are to be steered the sleeve 58 will be slipped to the position shown in Figs. 4 and 5. For actuation of the arm 70 a rock shaft 78 may be journaled at the lower sides of the side sills 60 and may have an upstanding crank arm 79 connected to the arm 70 by a rod 80. A crank 81, 82, is provided on each end of the rock shaft for its actuation.

The draw bar may be readily removed from one end of the trailer and applied to the other end, and the trailer may be drawn either end foremost with either two or four wheel steering.

If the trailer is closely alongside of a curb or is to be backed around a curve the wheels, which are at the time the rear wheels, may be manually steered to maneuver the trailer or the train to the best advantage. If a train of trailers is to be backed around a curve, as into a cross street to turn the train around, the rear wheels of the rear trailer may be cut around manually, thus modifying the angular relation between the rear trailer and that next and thus causing the front wheels to be affected by the arms 26, 27 sooner than would otherwise be the case. If desired this treatment may be applied to each trailer in the train.

A motor 84 may be secured upon the frame and may be geared to drive the adjacent crank disk 63, which motor may be controlled from the driver's seat. In case of such equipment a rod 85 will be extended along each trailer, which may be detachably connected adjacent each draw bar with the rod 85 on the vehicle ahead, and will be connected to each rod 80 for driver control of each sleeve 58. Under these circumstances the driver may disconnect the rear wheels of each trailer from automatic steering and may control each by the motors 84 at will.

Many changes may be made in the physical embodiment of my invention without departing from the spirit thereof.

I claim:

1. A trailer comprising, in combination, a frame, an axle adjacent each end of the frame, a wheel mounted upon a steering knuckle at each end of each axle, a steering arm on each knuckle, a rod connecting the steering arms associated with each axle, a pair of aligned shafts journaled upon said frame longitudinally thereof, said rods having squared abutting ends, a sleeve carrying a pinion concentric therewith fitting and slidable on said squared ends, spaced racks slidably mounted transversely of said frame adapted to mesh with said pinion when moved to a position upon either one of said squared ends and free of the other end, means for holding said racks stationary or for reciprocating them at will, and means for controlling either of said aligned shafts for steering one or both pairs of said wheels.

2. A trailer mechanism comprising, in combination, steerable front and rear wheels, a rod connecting each pair of wheels, a front and rear aligned longitudinal shaft having abutting inner ends, said shafts being attached respectively to the front and rear connecting rods, steering means operatively engaging the front shaft, means for at will connecting or disconnecting said shafts, and means for independently steering the rear wheels when the shafts are disconnected.

3. In a trailer mechanism, in combination, steerable front and rear wheels, a rod connecting each pair of wheels, a pair of aligned longitudinal shafts having squared abutting ends, the opposite ends of each of the shafts being attached respectively to the front and rear connecting rods, steering means for laterally shifting the front wheels, and a sleeve slidable on said squared abutting ends for at will connecting the rear wheels with the steering means.

4. A trailer mechanism comprising, in combination, a trailer adapted to be connected to a truck, a plurality of pairs of steerable wheels, transverse rods connecting each pair of wheels, aligned longitudinal shafts having abutting ends, each shaft being connected to a transverse connecting rod, steering means operatively engaging the front shaft for laterally moving the same upon change of angular relation between the truck and trailer, means for at will connecting or disconnecting said aligned shafts with each other, and motor means adapted to steer some of said wheels when the shafts are disconnected.

5. A trailer mechanism adapted to be connected to a truck comprising in combination, a frame, front and rear steerable wheels on said frame, a transverse rod connecting each pair of wheels, a draw bar adapted to be connected with either end of the frame, a longitudinal shaft connecting said transverse rods, and having its opposite ends journaled in the ends of the frame, steering arms secured adjacent each end of the longitudinal rod and projecting beyond the ends of the frame, steering means hinged to said draw bar and adapted to coact with the rear of said truck and with one of said steering arms.

REUBEN H. DE LAUNTY.